(12) United States Patent
Gosztyla et al.

(10) Patent No.: US 9,770,655 B2
(45) Date of Patent: Sep. 26, 2017

(54) MESH SYNCHRONIZATION

(75) Inventors: Jeffrey Gosztyla, Salt Lake City, UT (US); Martin Poulin, Glendale, CA (US); Daren Smith, Kaysville, UT (US); Mark McArthur, Bountiful, UT (US)

(73) Assignee: Disney Enterprises, Inc., Burbank, CA (US)

( * ) Notice: Subject to any disclaimer, the term of this patent is extended or adjusted under 35 U.S.C. 154(b) by 1153 days.

(21) Appl. No.: 12/100,961

(22) Filed: Apr. 10, 2008

(65) Prior Publication Data

US 2009/0088259 A1   Apr. 2, 2009

Related U.S. Application Data

(60) Provisional application No. 60/976,671, filed on Oct. 1, 2007.

(51) Int. Cl.
*G06F 15/16* (2006.01)
*H04W 4/00* (2009.01)
(Continued)

(52) U.S. Cl.
CPC .............. *A63F 13/34* (2014.09); *A63F 13/12* (2013.01); *A63F 13/327* (2014.09);
(Continued)

(58) Field of Classification Search
CPC ............ A63F 2300/00; A63F 2300/408; A63F 2300/556; A63F 2300/5546;
(Continued)

(56) References Cited

U.S. PATENT DOCUMENTS 8,036,140 B2 * 10/2011 Rao .................. G06F 9/465
                                                    370/254
2002/0083228 A1   6/2002 Chiloyan et al.
(Continued)

OTHER PUBLICATIONS

International Search Report of Oct. 7, 2008 in international application PCT/US08/68199.
Written Opinion of Oct. 7, 2008 in international application PCT/US08/68199.

*Primary Examiner* — James S McClellan
*Assistant Examiner* — Syvila Weatherford
(74) *Attorney, Agent, or Firm* — Sheppard Mullin Richter & Hampton LLP

(57) ABSTRACT

Embodiments of the present invention provide techniques for establishing and reestablishing associations between users of game devices. In one embodiment, information about an association between a user of a first game device and a user of a second game device is stored in the nonvolatile memories of first and second game media, the first and second game media being communicatively coupled with the first and second game devices respectively. If the first game device loses track of the association (e.g., the user of the first game devices swaps out the first game medium for another one, or the memory resident on the first game medium is corrupted/erased), an association notification received at the first game device from the second game device may be used to reestablish the association at the first game device. In this manner, previously established associations between users of game devices may be automatically established/reestablished.

19 Claims, 6 Drawing Sheets

(51) Int. Cl.
*A63F 13/34* (2014.01)
*A63F 13/795* (2014.01)
*A63F 13/327* (2014.01)
*A63F 13/30* (2014.01)
*A63F 13/92* (2014.01)
*H04L 12/28* (2006.01)

(52) U.S. Cl.
CPC ............ *A63F 13/795* (2014.09); *A63F 13/92* (2014.09); *A63F 2300/405* (2013.01); *A63F 2300/408* (2013.01); *A63F 2300/556* (2013.01); *A63F 2300/5546* (2013.01); *G06F 15/16* (2013.01); *H04L 12/28* (2013.01); *H04W 4/00* (2013.01)

(58) Field of Classification Search
CPC . A63F 2300/5566; H04W 88/02; H04W 4/00; H04W 4/001; H04W 4/003; H04W 4/0005; H04W 4/006; H04W 4/0008
USPC .......................................................... 370/401
See application file for complete search history.

(56) References Cited

U.S. PATENT DOCUMENTS

| | | | |
|---|---|---|---|
| 2003/0233537 A1* | 12/2003 | Wohlgemuth et al. | 713/151 |
| 2004/0203797 A1* | 10/2004 | Burr | 455/445 |
| 2005/0108427 A1* | 5/2005 | Datta | 709/238 |
| 2005/0266798 A1* | 12/2005 | Moloney | H04L 63/0435 455/41.2 |
| 2007/0005602 A1* | 1/2007 | Campadello | 707/10 |
| 2007/0055753 A1 | 3/2007 | Robb | |
| 2007/0060354 A1* | 3/2007 | Theimer | A63F 13/12 463/40 |
| 2007/0094279 A1* | 4/2007 | Mittal et al. | 707/100 |
| 2007/0282847 A1* | 12/2007 | Gwozdz | 707/10 |
| 2008/0102793 A1* | 5/2008 | Ananthanarayanan et al. | 455/411 |
| 2008/0112334 A1* | 5/2008 | Laroia et al. | 370/254 |
| 2008/0192265 A1* | 8/2008 | Weiss | 358/1.6 |
| 2008/0261686 A1* | 10/2008 | Bedingfield | 463/29 |
| 2008/0317050 A1* | 12/2008 | Xiong et al. | 370/401 |

\* cited by examiner

MESH SYNCHRONIZATION

CROSS-REFERENCES TO RELATED APPLICATIONS

The present application claims the benefit and priority under 35 U.S.C. 119(e) from U.S. Provisional Application No. 60/976,671, entitled "MESH SYNCHRONIZATION" filed Oct. 1, 2007, the entire contents of which are herein incorporated by reference for all purposes.

BACKGROUND OF THE INVENTION

Embodiments of the present invention relate to video games, and more particularly relate to techniques for establishing and reestablishing associations between users of game devices.

In recent years, the proliferation of broadband Internet access has prompted video game hardware manufacturers such as Nintendo, Sony, and Microsoft to incorporate networking capabilities into their video game devices. For example, both the Nintendo DS and Sony PSP, portable game devices manufactured by Nintendo and Sony respectively, have built-in support for 802.11b wireless communication. As a result, an ever increasing number of video game titles are being developed to support networked gaming functions that take advantage of the capabilities integrated into these game devices.

One feature included in several network-enabled video games is an association, or "friends," list. An association list is a list of other game players (i.e., virtual "friends" or "associates") that a user of a game device may interact with online (e.g., via an infrastructure or ad hoc-based network). Such interactions may include for instance, chatting with the other game players in a text or voice-based interface, or engaging the other game players in cooperative or adversarial online gameplay. Merely by way of example, the Xbox 360 game console manufactured by Microsoft supports a type of friends list functionality through Microsoft's "Xbox Live" online service.

Typically, an association list includes association information that uniquely identifies each associate on the list. This information may include, for example, a user name for each associate, and/or a network address of the game device used by each associate. The association information is then used to establish/re-establish associations with the associates when the owner of the list goes online. In current implementations, this association information is stored in a rewritable nonvolatile memory resident on the game device/console. For instance, the Xbox 360 is capable of storing friends list information to a local hard disk or local flash memory unit.

However, certain types of game devices may not have access to locally-resident, rewritable nonvolatile memory. In particular, portable game devices are often designed to fit a low cost, low power, and/or small form factor profile. As result, nonvolatile memory such as a hard disk or rewritable flash memory may be too costly, too power-hungry, and/or too bulky to integrate into such devices.

In such cases, a user of the game device that lacks rewritable nonvolatile memory may manually keep track of information identifying her associates, and then enter this information into her game device every time she wishes to interact with a particular associate. However, this approach is cumbersome and becomes unworkable if the user has more than a handful of associates on her list.

Another workaround is to store the association information in a rewritable nonvolatile memory resident on a game medium communicatively coupled with the game device. By way of example, the Nintendo DS uses game media known as game cards that often include a small amount of rewritable flash memory (or an EEPROM). However, simply storing and retrieving association information from game medium-resident memory (without any further logic) necessarily ties the association information a specific game medium. If, for example, the user of the game device switches the game medium for another one, of if the memory resident on the game medium is erased, the associations between the user and her associates cannot be reestablished.

BRIEF SUMMARY OF THE INVENTION

Embodiments of the present invention address the foregoing and other such problems by providing techniques for establishing and reestablishing associations between users of game devices. In one embodiment, information about an association between a user of a first game device and a user of a second game device is stored in the nonvolatile memories of first and second game media, the first and second game media being communicatively coupled with the first and second game devices respectively. If the first game device loses track of the association (e.g., the user of the first game devices swaps out the first game medium for another one, or the memory resident on the first game medium is corrupted/erased), an association notification received at the first game device from the second game device may be used to reestablish the association at the first game device. In this manner, previously established associations between users of game devices may be automatically established/reestablished.

According to one embodiment of the present invention, a method for establishing an association between a user of a first game device and a user of a second game device comprises transmitting a first identifier from the first game device to the second game device, receiving a second identifier at the first game device from the second game device, and searching for the second identifier among a first plurality of identifiers stored in a first nonvolatile memory, the first nonvolatile memory being resident on a first game medium communicatively coupled with the first game device. If the second identifier is found among the first plurality of identifiers, the user of the second game device is established as an associate of the user of the first game device, and an association notification is transmitted from the first game device to the second game device, the association notification including the first identifier.

In further embodiments, the association notification transmitted from the first game device is received at the second game device, and the first identifier is determined from the association notification. The first identifier is then searched for among a second plurality of identifiers stored in a second nonvolatile memory, the second nonvolatile memory being resident on a second game medium communicatively coupled with the second game device. If the first identifier is not found among the second plurality of identifiers, the user of the first game device is established as an associate of the user of the second game device, and the first identifier is stored in the second nonvolatile memory.

In some embodiments, if the second identifier is not found among the first plurality of identifiers, the user of the first game device is allowed to transmit an association invitation to the user of the second game device. If the association invitation is accepted by the user of the second game device, the user of the second game device is established as an associate of the user of the first game device, and the second identifier is stored in the first nonvolatile memory.

In further embodiments, the association invitation is received at the second game device, and if the association invitation is accepted by the user of the second game device, the user of the first game device is established as an associate of the user of the second game device, and the first identifier in a second nonvolatile memory, the second nonvolatile memory being resident on a second game medium communicatively coupled with the second game device.

In some embodiments, the first identifier uniquely identifies the first game device and the second identifier uniquely identifies the second game device. In other embodiments, the first identifier uniquely identifiers the user of the first game device and the second identifier uniquely identifiers the user of the second game device.

According to another embodiment of the present invention, a method for establishing an association between a user of a first game device and a user of a second game device comprises transmitting a first identifier from the first game device to the second game device, the first identifier uniquely identifying the first game device; transmitting a second identifier from the second game device to the first game device, the second identifier uniquely identifying the second game device; receiving the second identifier at the first game device, wherein the second identifier is already stored in a first nonvolatile memory resident on a game medium communicatively coupled with the first game device; and receiving the first identifier at the second game device, wherein the first identifier is not stored in a second nonvolatile memory resident on a game medium communicatively coupled with the second game device. The method further comprises establishing, at the first game device, the user of the second game device as an associate of the user of the first game device, transmitting an association notification from the first game device to the second game device, and processing the association notification at the second game device. In various embodiments, the processing of the association notification at the second game device comprises establishing the user of the first game device as an associate of the user of the second game device, and storing the first identifier in the second nonvolatile memory.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details. In other instances, well-known structures and devices are shown in block diagram form.

Embodiments of the present invention provide techniques for establishing and reestablishing associations (e.g., virtual friendships) between users of game devices. Some of the techniques described below may be particularly suited for use with game devices that do not include locally-resident, rewritable nonvolatile memory (e.g., the Nintendo DS). However, embodiments of the present invention are generally applicable to synchronizing data between any types of network-enabled devices.

Figure 1:
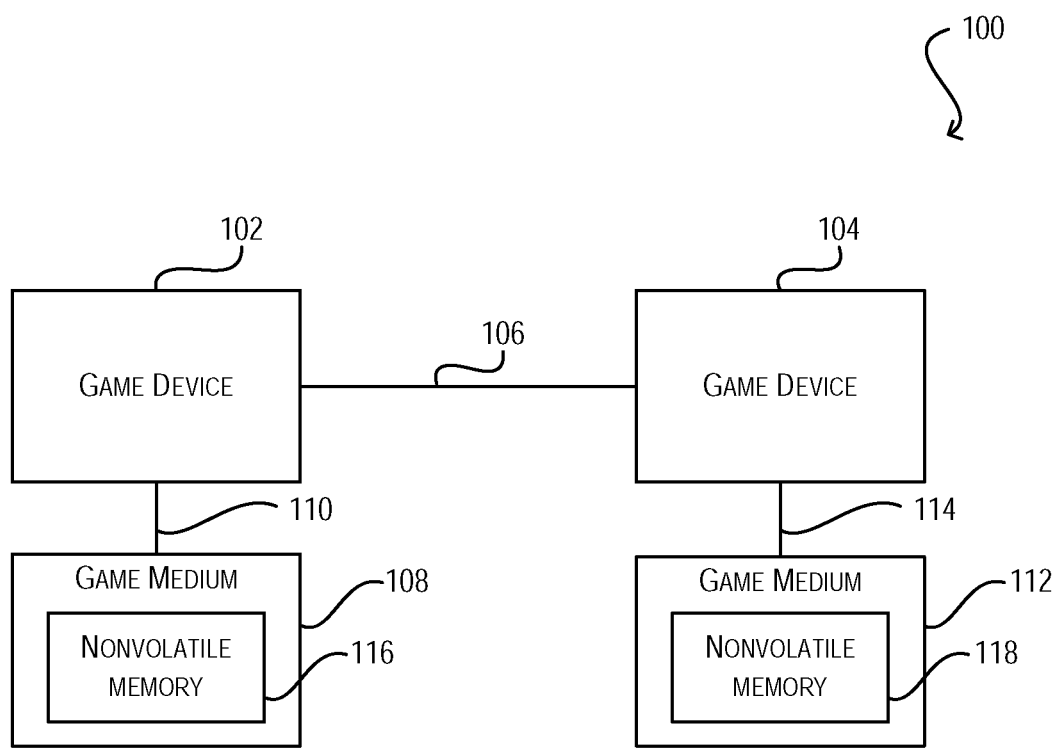
FIG. 1 is a simplified block diagram of a system for exchanging data between game devices in accordance with an embodiment of the present invention.

FIG. 1 is a simplified block diagram of a system for exchanging data between a first game device and a second game device according to an embodiment of the present invention. As shown, system 100 includes a first game device 102 communicatively coupled with a second game device 104 via a data link 106. As used herein, a game device is any device capable of executing a computer or video game. In one embodiment, game device 102, 104 is a dedicated game playing device, such as a Nintendo DS, Nintendo Wii, Sony PSP, Sony PlayStation 2, Sony PlayStation 3, Microsoft Xbox 360, and the like. In other embodiments, game device 102, 104 may be a multifunction device that is capable of playing games, such as a personal digital assistant (PDA), cellular phone, personal computer, and the like. The structure of an exemplary game device is discussed in greater detail with respect to FIG. 2 below.

First game device 102 may communicate with second game device 104 using data link 106. Data link 106 may be a wired (e.g., Universal Serial Bus (USB), Firewire, optical, etc.) or a wireless (e.g., RF, 802.11x, Bluetooth, infrared, etc.) link. Further, various different communications protocols may be used to communicate a data stream over data link 106, including both standardized (e.g., Ethernet, Bluetooth, etc.) and proprietary protocols. For example, a standardized protocol such as Ethernet may be used for link-level data transmission via data link 106, and a proprietary protocol such as the Nintendo DS communications protocol may be used for application-level data transmission via data link 106. One of ordinary skill in the art would recognize many variations, modifications, and alternatives.

Game devices 102, 104 are communicatively coupled with game media 108, 112 via data links 110 and 114. As shown, game media 108, 112 include nonvolatile memories 116, 118. In one embodiment, game media 108, 112 represent ROM or RAM-based game cards or game cartridges as used in game devices such as the Nintendo DS. Further, nonvolatile memories 116, 118 represent solid-state memory devices such as flash memory, EEPROM, and the like. In other embodiments, game media 108, 112 may represent other type of media for storing game data, such as optical (e.g., DVD, UMD, Bluray, HD-DVD, etc.) or magnetic (e.g., hard disk-based) media. Additionally, nonvolatile memories 116, 118 may be alternatively implemented as a rewritable portion of game media 108, 112 (i.e., rewritable portion of a hard disk or optical disc).

In some embodiments, data links 110, 114 may represent physical connections between game media 108, 112 and game devices 102, 104. For example, a Nintendo DS game card includes a series of pins that correspond to connectors positioned inside the Nintendo DS. When the game card is inserted into the Nintendo DS, the pins come into physical contact with the connectors, thereby creating an electrical connection that allows data to be exchanged between the game card and the device. In other embodiments, data links 10, 114 may represent any other type of transport for transferring data (wired, wireless, etc.).

Although only two game devices 102, 104 (and two corresponding game media 108, 112) are shown in FIG. 1, it should be appreciated that system 100 may incorporate any number of these devices. Merely by way of example, multiple game devices 102, 104 may be coupled via a wireless mesh or ad-hoc network. Alternatively, game devices 102, 104 may be communicatively coupled to multiple other game devices via an infrastructure based network, such as the Internet. Furthermore, each data link 106 between game devices may utilize a different type of data link (e.g., wired, wireless, etc.). One of ordinary skill in the art would recognize may variations, modifications, and alternatives.

Figure 2:
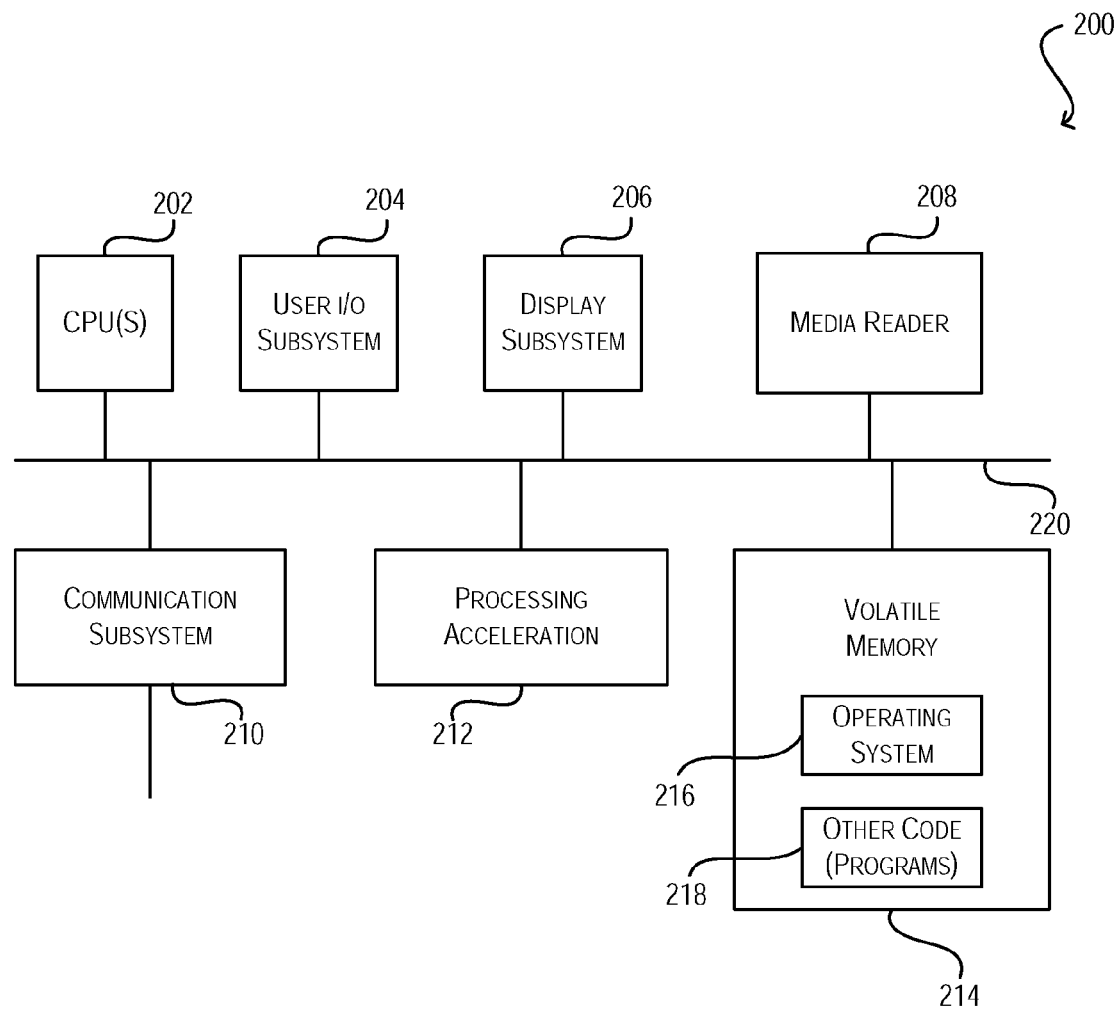
FIG. 2 is a simplified block diagram of a game device that may be used in accordance with an embodiment of the present invention.

FIG. 2 is a simplified block diagram of a game device 200 that may be used in accordance with an embodiment of the present invention. In various embodiments, game device 200 of FIG. 2 corresponds to either game device 102 or 104 of FIG. 1. In an exemplary embodiment, device 200 is a portable game device such as the Nintendo DS that does not incorporate rewritable nonvolatile memory.

As shown in FIG. 2, game device 200 comprises hardware elements that may be coupled via one or more electrical buses 222. The hardware elements may include one or more central processing units (CPUs) 202, a user input/output subsystem 204 (for controlling a game controller or other I/O peripheral), and a display subsystem 206 (for controlling a display device such as an LCD screen). Game device 200 may additionally include a media reader 208 (e.g., cartridge slot, optical disk drive, etc.) configured to accept a game medium such as game medium 108 or 112 of FIG. 1, and a communications subsystem 210 (e.g., a modem, a network interface (wireless or wired), an infra-red communication device, a peripheral interface (wireless or wired), etc.). In specific embodiments, communication subsystem 210 may comprise one or more interfaces or ports (e.g., USB, Firewire, 802.11x, Bluetooth, RF, etc.) for communicatively coupling game device 200 to other game devices.

Game device 200 may further include a volatile memory 214, which may include, for example, one or more Random Access Memory (RAM) devices. In some embodiments, game device 200 may optionally include a processing acceleration unit 212, which may include a digital signal processor (DSP), a graphics acceleration processor, a physics acceleration processor, and/or the like.

Game device 200 may also comprise software elements, shown as being currently located within volatile memory 214, including an operating system 216 and/or other code 218. In one set of embodiments, other code 218 comprises application programs such as a video game program and/or a game device application for establishing/reestablishing associations between users of game devices as illustrated in FIGS. 3, 4, 5, 6. It should be appreciated that alternative embodiments of game device 200 may have numerous variations from that described above. For example, customized hardware might also be used and/or particular elements might be implemented in hardware, software, or both. Further, connection to other computing devices and peripheral devices may be employed. One of ordinary skill in the art would recognize many variations, modifications, and alternatives.

Figure 3:
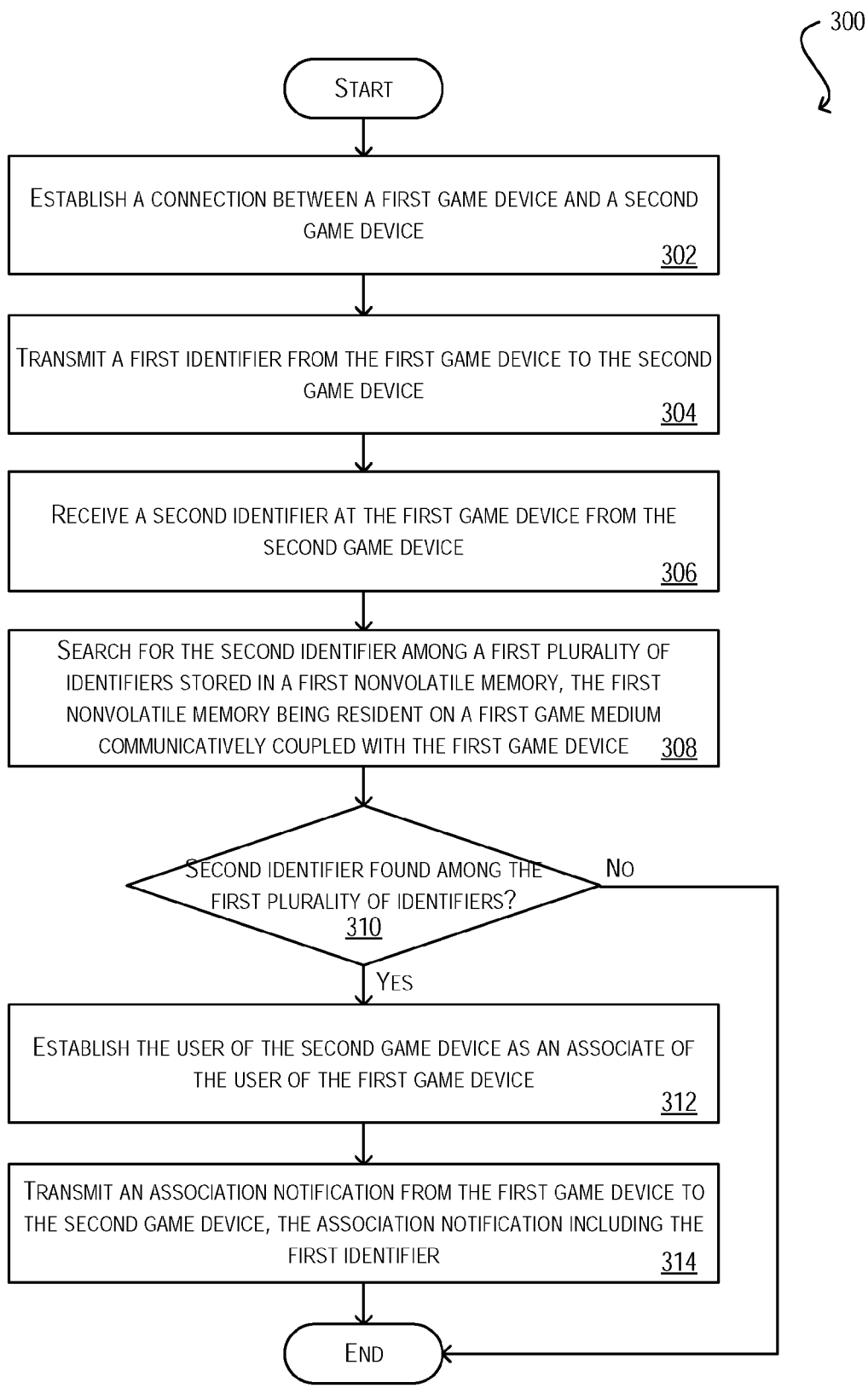
FIG. 3 is a flowchart of the steps performed in establishing/reestablishing an association between a user of a first game device and a user of second game device in accordance with an embodiment of the present invention.

FIG. 3 depicts a flowchart 300 of the steps performed in establishing/reestablishing an association between a user of a first game device and a user of second game device in accordance with an embodiment of the present invention. The processing depicted in FIG. 3 may be performed by software modules executed by hardware modules (such as CPU 202 of FIG. 2), hardware modules, or combinations thereof. The software modules may be stored on a computer-readable medium (such as game media 108, 112 of FIG. 1). The method depicted in FIG. 3 is merely illustrative of an embodiment of the present invention and is not intended to limit the scope of the present invention. Other variations, modifications, and alternatives are also within the scope of the present invention. In one embodiment, method 300 is performed by a game device such as game device 102, 104 of FIG. 1.

At step 302, a connection is established between a first game device and a second game device. The connection may be, for example, a wireless or a wired communications link. Furthermore, the connection may be a direct (e.g., peer-to-peer) link between the first and second game devices, or an indirect link. In various embodiments, the connection corresponds to data link 106 of FIG. 1.

Once a connection has been established, a first identifier is transmitted from the first game device to the second game device, and a second identifier is received at the first game device from the second game device (304, 306). In one set of embodiments, the first and second identifiers uniquely identify the first and second game devices. For example, the first and second identifiers may correspond to the MAC addresses of the first and second game devices respectively. In other embodiments, the first and second identifiers uniquely identify users of the first and second game devices. For example, the first and second identifiers may correspond to unique user names of the users of the first and second game devices respectively. In various embodiments, the identifier of a game device or user of a game device may be initially determined and stored in a nonvolatile memory of a game medium communicatively coupled to the game device. The identifier may then be read from the nonvolatile memory of the game medium when needed (as in steps 304, 306).

At step 308, the second identifier received from the second game device is searched for among a first plurality of identifiers stored in a first nonvolatile memory, the first nonvolatile memory being resident on a first game medium communicatively coupled with the first game device. In one set of embodiments, the first plurality of identifiers stored in the first nonvolatile memory represent previously established associates, or virtual friends, of the user of the first game device. For example, the identifiers may correspond to MAC addresses of the game devices of those associates. Accordingly, searching for the second identifier among the first plurality of identifiers corresponds to determining whether the user of the second game device has been previously established as an associate of the user of the first game device.

If the second identifier is found among the first plurality of identifiers (310), the user of the second game device is established, at the first game device, as an associate of the user of the first game device (312). In various embodiments, this refers to enabling certain interactions between the user of the first game device and the user of the second game device until, for example, the data link between the first and second game devices is lost. Such interactions may include voice or text-based chatting, exchanging virtual items or game scores, engaging in online gameplay, and the like.

Further, an association notification is transmitted from the first game device to the second game device (314). In various embodiments, the association notification includes the identifier of the first game device (or user of the first game device). As described with respect to FIG. 4 below, the association notification may be used by the second game device to reestablish, at the second game device, an association between the user of the first and second game devices.

If the second identifier is not found among the first plurality of identifiers, the user of the second game device is determined to not be an associate of the user of the first game device, and method 300 ends. In this scenario, the user of the first game device may be allowed to transmit an association invitation to the user of the second game device to initiate an association. This process is described in further detail with respect to FIG. 5 below.

It should be appreciated that the specific steps illustrated in FIG. 3 provide a particular method for establishing/reestablishing associations between users of game devices according to an embodiment of the present invention. Other sequences of steps may also be performed according to alternative embodiments. For example, alternative embodiments of the present invention may perform the steps outlined above in a different order. Moreover, the individual steps illustrated FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
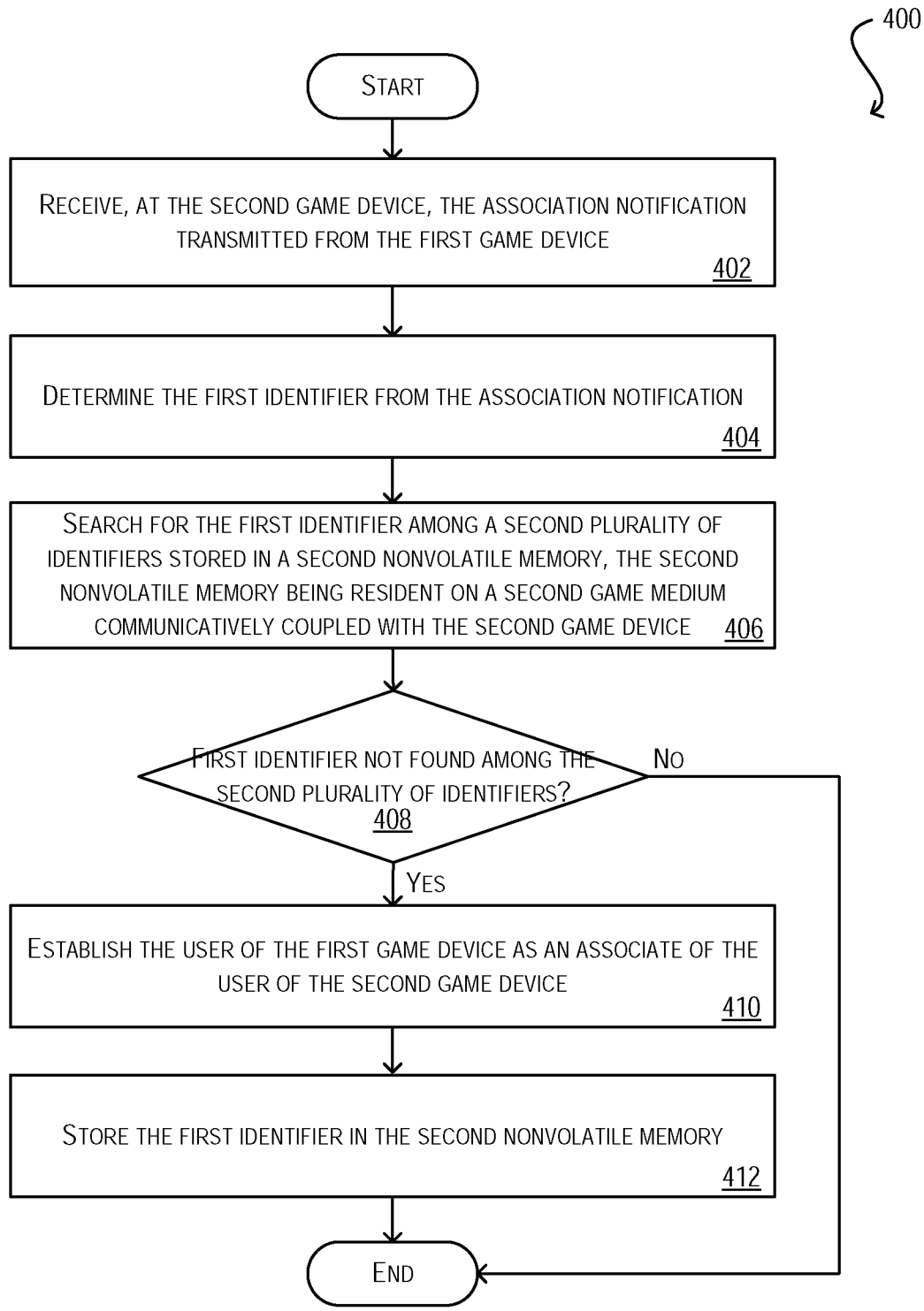
FIG. 4 is a flowchart of the steps performed in processing an association notification received at a game device in accordance with an embodiment of the present invention.

FIG. 4 is a flowchart of the steps performed in processing an association notification received at a game device in accordance with an embodiment of the present invention. For example, method 400 may be used to process the association notification transmitted from the first game device to the second game device in step 314 of FIG. 3. The processing depicted in FIG. 4 may be performed by software modules executed by hardware modules (such as CPU 202 of FIG. 2), software modules, or combinations thereof. The software modules may be stored on a computer-readable medium (such as game media 108, 112 of FIG. 1). The method depicted in FIG. 4 is merely illustrative of an embodiment of the present invention and is not intended to limit the scope of the present invention. Other variations, modifications, and alternatives are also within the scope of the present invention. In one embodiment, method 400 is performed by a game device such as game device 102, 104 of FIG. 1.

At step 402, the association notification is received at the second game device from the first game device. At step 404, the identifier of the first game device (or user of the first game device) is determined from the notification. The first identifier is then searched for among a plurality of identifiers stored in a second nonvolatile memory, the second nonvolatile memory being resident on a second game medium communicatively coupled with the second game device (406). In one set of embodiments, the second plurality of identifiers stored in the second nonvolatile memory represent previously established associates, or virtual friends, of the user of the second game device. For example, the identifiers may correspond to MAC addresses of the game devices of those associates. Accordingly, searching for the first identifier among the second plurality of identifiers corresponds to determining whether the user of the first game device has been previously established as an associate of the user of the second game device.

Since the association notification received from the first game device indicates that a previous association existed between the users of the first and second game devices, the second plurality of identifiers stored in the second nonvolatile memory is checked to verify that the first identifier is there. If the first identifier is not found among the second plurality of identifiers (408), that means the association information at the second game device was somehow lost. This may occur, for example, if the user of the second game device swapped out the game medium containing the association information with another game medium, or if the second nonvolatile memory on the second game medium was erased or corrupted. In this situation, the user of the first game device is reestablished, at the second game device, as an associate of the user of the second game device (410). Further, the first identifier is stored in the second nonvolatile memory (412). In this manner, associations between users of game devices may be automatically reestablished at each game device, even if one of the game devices loses track of the association.

If the first identifier is found among the second plurality of identifiers, the user of the first game device is already established, at the second game device, as an associate of the user of the second game device. Accordingly, method 400 terminates.

It should be appreciated that the specific steps illustrated in FIG. 4 provide a particular method for processing an association notification according to an embodiment of the present invention. Other sequences of steps may also be performed according to alternative embodiments. For example, alternative embodiments of the present invention may perform the steps outlined above in a different order. Moreover, the individual steps illustrated FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
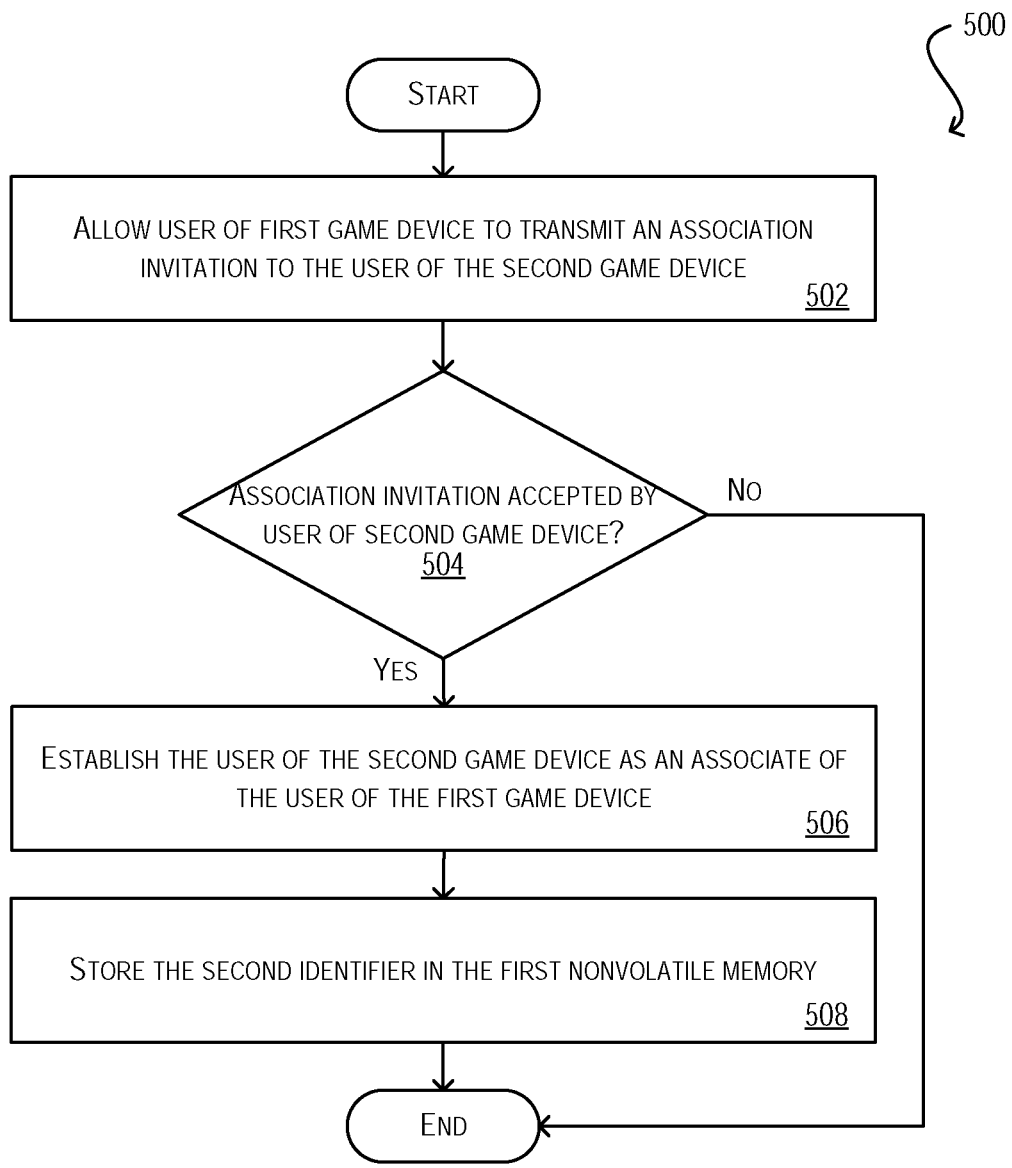
FIG. 5 is a flowchart of the steps performed in sending an association invitation in accordance with an embodiment of the present invention.

FIG. 5 is a flowchart of the steps performed in sending an association invitation in accordance with an embodiment of the present invention. As described previously, a user of a first game device may, in certain circumstances, transmit an association invitation to a user of second game device to establish an association. This process is detailed in method 500. The processing depicted in FIG. 5 may be performed by software modules executed by hardware modules (such as CPU 202 of FIG. 2), software modules, or combinations thereof. The software modules may be stored on a computer-readable medium (such as game media 108, 112 of FIG. 1). The method depicted in FIG. 5 is merely illustrative of an embodiment of the present invention and is not intended to limit the scope of the present invention. Other variations, modifications, and alternatives are also within the scope of the present invention. In one embodiment, method 500 is performed by a game device such as game device 102, 104 of FIG. 1.

At step 502, a user of a first game device is allowed to transmit an association invitation to the user of a second game device. This may occur, for example, if the user of the second game device is determined to not be an associate of the user of the first game device. Thus, an association invitation is a mechanism for establishing an association between two users for the first time. In one embodiment, the association invitation includes an identifier that uniquely identifies the transmitting game device (or the user of the transmitting game device).

In various embodiments, the association invitation is received at the second game device and either accepted or rejected by the user of the second game device (504). If the association invitation is accepted, the user of the second game device is established, at the first game device, as an associate of the user of the first game device (506). As mentioned above, establishing this association enables the user of the first game device to engage in certain interactions with the user of the second game device, such as chatting, online gameplay, and the like. Further, an identifier that uniquely identifiers the second game device (or the user of the second game device) is stored in the first nonvolatile memory of the first game medium communicatively coupled with the first game device (508). In this manner, the association information is maintained so that the association may be reestablished in future connections/network sessions between the first and second game devices.

If the association invitation is rejected by the user of the second game device, an association cannot be established and method 500 terminates.

It should be appreciated that the specific steps illustrated in FIG. 5 provide a particular method for sending an association invitation according to an embodiment of the present invention. Other sequences of steps may also be performed according to alternative embodiments. For example, alternative embodiments of the present invention may perform the steps outlined above in a different order. Moreover, the individual steps illustrated FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
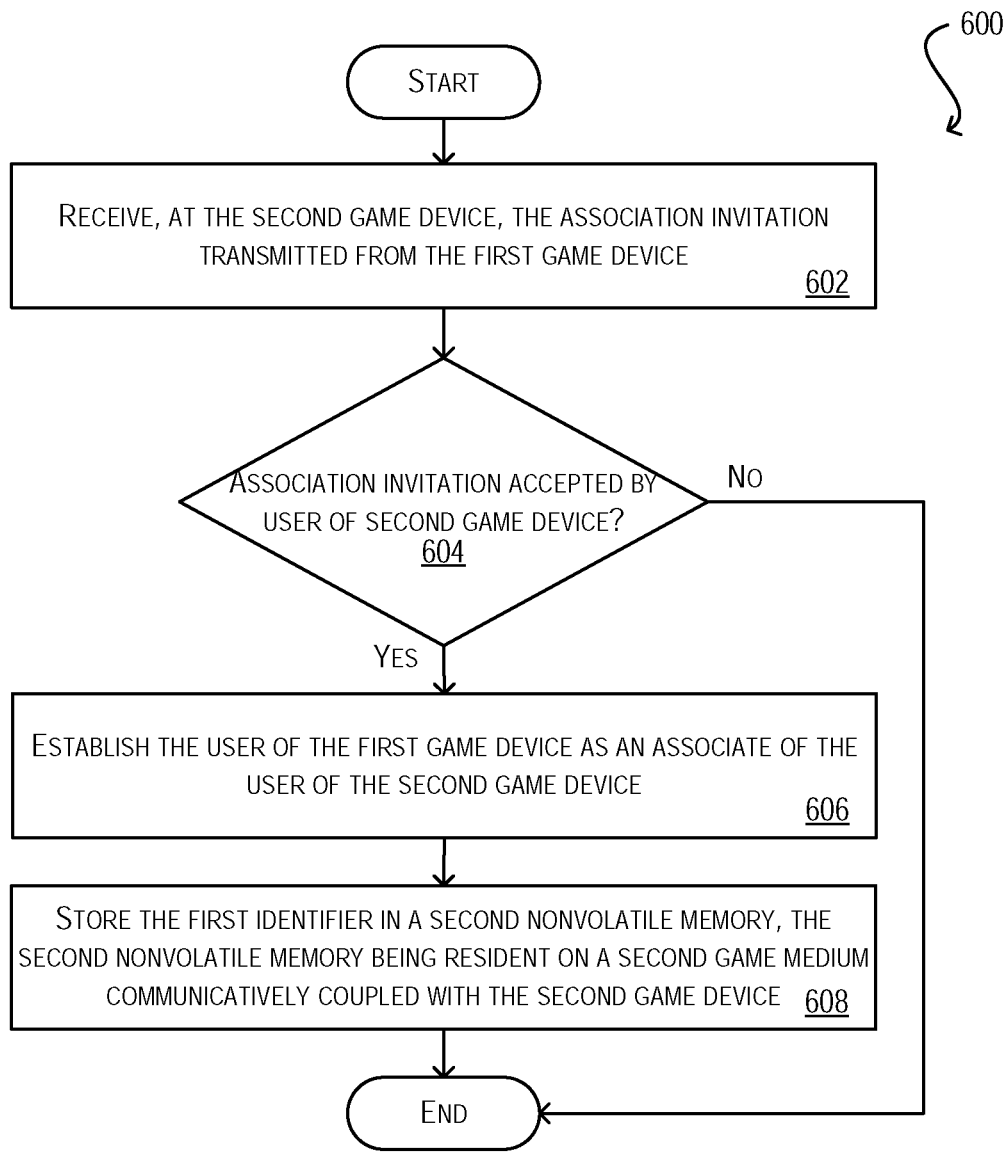
FIG. 6 is a flowchart of the steps performed in processing an association invitation received at a game device in accordance with an embodiment of the present invention.

FIG. 6 is a flowchart of the steps performed in processing an association invitation at a game device in accordance with an embodiment of the present invention. For example, method 600 may be used to process the association invitation transmitted from the first game device to the second game device in step 502 of FIG. 5. The processing depicted in FIG. 6 may be performed by software modules executed by hardware modules (such as CPU 202 of FIG. 2), software modules, or combinations thereof. The software modules may be stored on a computer-readable medium (such as game media 108, 112 of FIG. 1). The method depicted in FIG. 6 is merely illustrative of an embodiment of the present invention and is not intended to limit the scope of the present invention. Other variations, modifications, and alternatives are also within the scope of the present invention. In one embodiment, method 600 is performed by a game device such as game device 102, 104 of FIG. 1.

At step 602, the association invitation is received at the second game device from the first game device. In various embodiments, the user of the second game device may be shown information from the association invitation and may be prompted to either accept or reject the invitation.

If the association invitation is accepted, the user of the first game device is established, at the second game device, as an associate of the user of the second game device (606). Further, an identifier that uniquely identifies the first game device (or the user of the first game device) is stored in a second nonvolatile memory, the second nonvolatile memory being resident on a second game medium communicatively coupled with the second game device (608). In this manner, the association information is maintained so that the association may be reestablished in future connections/network sessions between the second and first game devices.

If the association invitation is rejected, an association cannot be established and method 600 terminates.

It should be appreciated that the specific steps illustrated in FIG. 6 provide a particular method for processing an association invitation received at a game device according to an embodiment of the present invention. Other sequences of steps may also be performed according to alternative embodiments. For example, alternative embodiments of the present invention may perform the steps outlined above in a different order. Moreover, the individual steps illustrated FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Although specific embodiments of the invention have been described, various modifications, alterations, alternative constructions, and equivalents are also encompassed within the scope of the invention. For example, the described invention is not restricted to operation with certain types of games or game devices, but is free to operate with a plurality of different game types or game devices. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method for establishing a virtual gameplay association between a first user of a first game device and a second user of a second game device, the first game device having one or more processors configured to execute a first operating system stored on a first volatile memory of the first game device, a first user input/output subsystem, a first media reader, and a first display subsystem, and the second game device having one or more processors configured to execute a second operating system stored on a second volatile memory of the second game device, a second user input/output subsystem, a second media reader, and a second display subsystem, the method comprising:

establishing a wireless communication session between the first game device and the second game device, wherein the first user of the first game device and the second user of the second game device engage in virtual gameplay interactions via the established wireless communication session;

executing, by the first operating system executed by the one or more processors of the first game device, a first game by accessing game information stored on a first nonvolatile electronic storage of a first game medium, the first game medium being configured for removable coupling to the first game device via the first media reader, the game information being accessible to the first operating system when the first game medium is coupled to the first game device, wherein the game information includes:
  a game application for the first game; and
  a first plurality of identifiers, the first plurality of identifiers being specific to the first game and corresponding to previously established virtual gameplay associations between the first user and other users of the first game;
displaying output from execution of the first game to the first user through the first display subsystem;
transmitting, via the established wireless communication session, a first identifier from the first game device to the second game device, the first identifier uniquely identifying the first game device;
receiving, via the established wireless communication session, a second identifier at the first game device from the second game device, the second identifier uniquely identifying the second game device;
searching, by the one or more processors of the first game device, for the second identifier among the first plurality of identifiers stored in the first nonvolatile electronic storage;
responsive to the second identifier being found by the one or more processors of the first game device to be among the first plurality of identifiers:
  determining, by the one or more processors of the first game device, that a virtual gameplay association has previously been established between the first user of the first game device and the second user of the second game device;
  reestablishing, by the one or more processors of the first game device and within non-transient electronic storage local to the first game device, the second user as a virtual gameplay associate of the first user; and
  transmitting, via the established wireless communication session, a virtual gameplay association notification from the first game device to the second game device, the virtual gameplay association notification including the first identifier, the virtual gameplay association notification facilitating virtual gameplay interactions in the first game by the first user and second user via the established wireless communication session;
receiving, at the second game device, the virtual gameplay association notification transmitted from the first game device;
determining, by the one or more processors of the second game device, the first identifier from the virtual gameplay association notification;
searching, by the one or more processors of the second game device, for the first identifier among a second plurality of identifiers stored in a second nonvolatile electronic storage, the second nonvolatile electronic storage being resident on a second game medium removably coupled with the second game device via the second media reader, the second plurality of identifiers corresponding to previously established virtual gameplay associations between the second user and other users of the first game, the second nonvolatile electronic storage further storing a second game application for the first game; and
responsive to the first identifier not being found among the second plurality of identifiers:
  determining, by the one or more processors of the second game device, that a virtual gameplay association has not previously been established between the second user of the second game device and the first user of the first game device; and
  establishing, by the one or more processors of the second game device and within non-transient electronic storage local to the second game device, the first user as a virtual gameplay associate of the second user to facilitate the virtual gameplay interactions in the first dame by the first user and second user via the established wireless communication session.

2. The method of claim 1 further comprising:
responsive to the second identifier not being found among the first plurality of identifiers:
  determining, by the one or more processors of the first game device, that a virtual gameplay association has not previously been established between the first user of the first game device and the second user of the second game device,
  presenting to the first user through the first display subsystem a control option to transmit a virtual gameplay association invitation to the second user;
  receiving, through the first user input/output subsystem, a selection of the control option;
  responsive to reception of the selection of the control option, transmitting the association invitation to the second user via the established wireless communication session; and
responsive to the virtual gameplay association invitation being accepted by the second user:
  establishing, by the one or more processors of the first game device and within the non-transient electronic storage local to the first game device, the second user as a virtual gameplay associate of the first user to facilitate virtual gameplay interactions in the first game by the first user and second user via the established wireless communication session.

3. The method of claim 2 further comprising:
receiving, at the second game device, the virtual gameplay association invitation transmitted from the first game device via the established wireless communication session; and
responsive to the virtual gameplay association invitation being accepted by the second user:
  establishing, by the one or more processors of the second game device, the first user as a virtual gameplay associate of the second user to facilitate the virtual gameplay interactions in the first game by the first user and second user via the established wireless communication session; and
  storing the first identifier in a second nonvolatile electronic storage, the second nonvolatile electronic storage being resident on a second game medium removably coupled with the second game device via the second media reader, the second nonvolatile electronic storage further storing a second game application for the first game.

4. The method of claim 1 further comprising:
determining, by the one or more processors of the first game device, the first identifier; and storing the first identifier in the first nonvolatile electronic storage.

5. The method of claim 1 wherein the first game device and the second game device do not have access to locally-resident, rewritable nonvolatile electronic storage.

6. The method of claim 1 wherein the first identifier uniquely identifies the first user and the second identifier uniquely identifies the second user.

7. The method of claim 1 wherein the first and second game devices are portable.

8. The method of claim 1 wherein the non-transient electronic storage local to the first game device is flash memory.

9. The method of claim 1 wherein the first game medium is a ROM cartridge.

10. The method of claim 1 wherein the first identifier is a MAC address of the first game device.

11. The method of claim 1, wherein establishing the second user as a virtual gameplay associate of the first user facilitates allowing the first user to send chat messages to, and receive chat messages from, the second user.

12. A game device configured for establishing a virtual gameplay association between a user of the game device and other users of other game devices, the game device comprising:
 a volatile memory configured to store an operating system;
 a media reader for communicatively removably coupling a game medium to the game device, the game medium having resident thereon a nonvolatile electronic storage configured to store game information associated with a game, the game information including a game application for the game and a plurality of identifiers, the plurality of identifiers being specific to the game, the plurality of identifiers corresponding to previously established virtual gameplay associations between the user of the game device and other users of the game, the other users being associated with other game devices;
 a display subsystem configured to display information to the user;
 an input/output subsystem configured to receive input from the user; and
 a processing component configured to:
  establish a wireless communication session between the game device and a second game device, wherein the user of the game device and a second user of the second game device engage in virtual gameplay interactions via the wireless communication session;
  execute the operating system stored on the volatile memory, the operating system being configured to execute the game by obtaining the game information from the game medium when the game medium is coupled to the game device via the media reader;
  control the display subsystem to display output generated from executing the game;
  transmit a first identifier to the second game device via the established wireless communication session, the first identifier uniquely identifying the game device;
  receive a second identifier from the second game device via the established wireless communication session, the second identifier uniquely identifying the second game device;
  search for the second identifier among the plurality of identifiers stored in the nonvolatile electronic storage; and
  responsive to the second identifier being found among the plurality of identifiers:
   determine that a virtual gameplay association has previously been established between the user of the game device and the second user of the second game device;
   reestablish, within non-transient electronic storage local to the game device, the second user of the second game device as a virtual gameplay associate of the user of the game device; and
   transmit a virtual gameplay association notification to the second game device via the established wireless communication session; and
  wherein the virtual gameplay association notification transmitted from the game device to the second game device via the established wireless communication session is processed at the second game device, the processing at the second game device comprising:
   searching for the first identifier among a second plurality of identifiers stored in a second nonvolatile electronic storage, the second nonvolatile electronic storage being resident on a second game medium communicatively coupled with the second game device, the second plurality of identifiers corresponding to previously established virtual gameplay associations between the second user and other users of the game, the second nonvolatile electronic storage further storing a second game application for the game; and
   responsive to the first identifier not being found among the second plurality of identifiers:
    determining, by second game device, that a virtual gameplay association has not previously been established between the second user of the second game device and the user of the game device;
    establishing, within non-transient electronic storage local to the second game device, the user of the game device as a virtual gameplay associate of the second user of the second game device to facilitate virtual gameplay interactions in the game by the user and second user via the established wireless communication session; and
    storing the first identifier in the second nonvolatile electronic storage.

13. A non-transitory machine-readable medium for a game device, the machine-readable medium having stored thereon a series of instructions which, when executed by a processing component of the game device, cause the processing component to establish a virtual gameplay association between a first user of the game device and a second user of a second game device, the processing component of the game device executing an operating system stored on volatile memory of the game device, the establishing of the virtual gameplay association comprising:
 establishing a wireless communication session between the game device and the second game device, wherein the first user of the game device and the second user of the second gameplay device engage in virtual gameplay interactions over the established wireless communication session;
 executing, by the operating system of the game device, a game by accessing game information stored on a first nonvolatile electronic storage of a first game medium, the first game medium being configured for removable coupling to the game device via a first media reader of the first game device, the game information being accessible to the first operating system when the first game medium is coupled to the first game device, wherein the game information includes:

a game application for the game; and
a plurality of identifiers, the plurality of identifiers being specific to the game and corresponding to previously established virtual gameplay associations between the first user and other users of the game;
displaying output from the execution of the game through a display subsystem of the game device;
controlling the game based on input received from the first user through a user input/output subsystem of the game device;
transmitting a first identifier from the game device to the second game device via the established wireless communication session, the first identifier uniquely identifying the game device;
receiving a second identifier at the game device from the second game device via the established wireless communication session, the second identifier uniquely identifying the second game device;
searching, at the game device, for the second identifier among the plurality of identifiers stored in the first nonvolatile electronic storage;
responsive to the second identifier being found among the plurality of identifiers:
  determining, at the game device, that a virtual gameplay association has previously been established between the first user of the game device and the second user of the second game device;
  reestablishing, within non-transient electronic storage local to the game device, the second user of the second game device as a virtual gameplay associate of the first user of the game device; and
  transmitting, via the established wireless communication session, a virtual gameplay association notification from the game device to the second game device, the virtual gameplay association notification facilitating virtual gameplay interactions in the game by the first user and the second user via the established wireless communication session; and
wherein the virtual gameplay association notification transmitted from the game device to the second game device is processed at the second game device, the processing comprising:
  searching for the first identifier among a second plurality of identifiers stored in a second nonvolatile electronic storage, the second nonvolatile electronic storage being resident on a second game medium communicatively coupled with the second game device, the second plurality of identifiers corresponding to previously established virtual gameplay associations between the second user and other users of the game, the second nonvolatile electronic storage further storing a second game application for the game; and
  responsive to the first identifier not being found among the second plurality of identifiers:
    determining, at the second game device, that a virtual gameplay association has not previously been established between the first user of the game device and the second user of the second game device;
    establishing, at the second game device, the first user of the game device as a virtual gameplay associate of the second user of the second game device; and
    storing the first identifier in the second nonvolatile electronic storage.

14. The method of claim 1, wherein virtual gameplay interactions comprise one or more of cooperative gameplay, adversarial gameplay, or chatting.

15. The method of claim 1, wherein a virtual gameplay association comprises a virtual gameplay friendship.

16. The game device of claim 12, wherein virtual gameplay interactions comprise one or more of cooperative gameplay, adversarial gameplay, or chatting.

17. The game device of claim 12, wherein a virtual gameplay association comprises a virtual gameplay friendship.

18. The machine-readable medium of claim 13, wherein virtual gameplay interactions comprise one or more of cooperative gameplay, adversarial gameplay, or chatting.

19. The machine-readable medium of claim 13, wherein a virtual gameplay association comprises a virtual gameplay friendship.

* * * * *